United States Patent
Matsui

(10) Patent No.: US 8,356,906 B2
(45) Date of Patent: Jan. 22, 2013

(54) SCREEN UNIT AND PROJECTION DISPLAY APPARATUS

(75) Inventor: Tomomi Matsui, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 219 days.

(21) Appl. No.: 13/017,257

(22) Filed: Jan. 31, 2011

(65) Prior Publication Data

US 2011/0188009 A1 Aug. 4, 2011

(30) Foreign Application Priority Data

Feb. 1, 2010 (JP) .................................. 2010-020689

(51) Int. Cl.
*G03B 21/28* (2006.01)
*G03B 21/60* (2006.01)

(52) U.S. Cl. ............................ 353/98; 359/456; 359/457

(58) Field of Classification Search ..................... 353/74, 353/77, 98; 359/443, 455, 456, 457, 460, 359/619

See application file for complete search history.

(56) References Cited

U.S. PATENT DOCUMENTS 7,248,410 B2 * 7/2007 Miyata .......................... 359/619

2007/0035826 A1 2/2007 Yokoyama et al.

FOREIGN PATENT DOCUMENTS

| JP | 2001-154274 A | 6/2001 |
| JP | 2002-244209 A | 8/2002 |
| JP | 2005-107150 A | 4/2005 |

* cited by examiner

*Primary Examiner* — Georgia Y Epps
*Assistant Examiner* — Don Williams
(74) *Attorney, Agent, or Firm* — Birch, Stewart, Kolasch & Birch, LLP

(57) ABSTRACT

A screen unit includes an upper horizontal rim, lateral vertical rims, and a lower horizontal rim U-shaped in cross section that cover four side outer peripheries of a laminated body including a thin sheet glass, a Fresnel lens sheet that is a part of a cylindrical surface with an axis line extending in a first direction parallel to the thin sheet glass and is warped in a shape convex toward a side of the thin sheet glass, and a lenticular lens sheet that is a part of a cylindrical surface with an axis line extending in a direction parallel to the thin sheet glass and perpendicular to the first direction, is warped in a shape convex toward a side of the thin sheet glass, and sandwiches the thin sheet glass with the Fresnel lens sheet.

7 Claims, 3 Drawing Sheets

SCREEN UNIT AND PROJECTION DISPLAY APPARATUS

BACKGROUND OF THE INVENTION

1. Field of the Invention

The present invention relates to a projection display apparatus having a semiconductor laser as a light source, such as a projection television, and particularly to a screen unit, in which a thin sheet glass is sandwiched between a Fresnel lens sheet and a lenticular lens sheet, and a projection display apparatus that includes the screen unit.

2. Description of the Related Art

As disclosed in Japanese Patent Application Laid-open No. 2001-154274 (page 2 and FIG. 3), there is generally known a technique in which a sheet glass is sandwiched between two lens sheets, which are a Fresnel lens sheet and a lenticular lens sheet. These lens sheets are warped in a concave or convex manner by heat treatment and laminated to be closely attached to the sheet glass to form a support structure, which prevents the lens sheets from waving in a concave or convex manner due to expansion or contraction of a screen according to environment changes in an ambient temperature or humidity.

In a projection television that includes a transmission screen with a high incidence angle, which realizes reduction in the depth of the product, images are deformed even by small deformation on an imaging surface of a Fresnel lens sheet. Accordingly, usage of a screen formed by bonding two lens sheets to a glass substrate with an ultraviolet curable resin or a thermoset resin is also generally known.

In a conventional screen unit, when an image composed of light modulated according to an image signal is displayed on a screen, scintillation in which bright spots and dark spots are distributed randomly sometimes occurs due to light interference, which may make observers uncomfortable. Because laser light has high coherence, scintillation particularly easily occurs. Accordingly, a method of vibrating at least one of two screens to suppress scintillation is proposed (Japanese Patent Application Laid-open No. 2005-107150 (page 7 and FIG. 3)), and also there is generally known a method of integrally forming a diffuse material inside of the two screens to provide an imaging surface to each of the Fresnel lens sheet and the lenticular lens sheet to suppress scintillation.

However, these conventional techniques leave some problems unresolved.

The first problem is as follows. The lens sheets, which are to be laminated on the thin sheet glass, are curved in cylindrically convex shapes by heat treatment to provide curvature factors to the lens sheets, the curved surfaces of which correspond to rotation surfaces around horizontal axes. In doing so, the axes of curved surfaces of the two lens sheet are set to be the same (both axes are horizontal). Therefore, when three sheets are laminated, reaction force in directions away from the thin sheet glass is generated on upper and lower sides of a screen, which makes an operation to fit the sheets into a groove formed on a screen holding unit of the screen unit troublesome. Before fitting the sheets into the screen holding unit, measures of holding four side edges with U-shaped clips, tapes, or the like are sometimes taken. However, even with this configuration, the clips or tapes are easily unhooked or torn.

The second problem is as follows. If there is a clearance from the holding unit along the periphery of the screen when the screen unit is fitted into a frame rim, restoring force of the curved lens sheets causes deformation in peripheral portions, and the periphery of a projected image is deformed. In contrast, if the holding unit is firmly pressed, movement caused by expansion or contraction of the lens sheets according to changes in a temperature or humidity is hindered. Therefore, central portions of the lens sheets are bulged and the center of the projected image is deformed.

The third problem is as follows. The bonding of the Fresnel lens sheet and the lenticular lens sheet to the glass substrate or the vibration of one of the lens sheets against the scintillation makes the method of manufacturing a screen or the configuration of the screen complicated, which makes screen holding devices expensive.

SUMMARY OF THE INVENTION

The present invention has been made in view of the above problems and provides a screen unit, the assembly of which can be performed easily with low costs and image deformations of which are eliminated to improve the quality, and a projection display apparatus including the screen unit.

A screen unit according to an aspect of the present of the present invention includes a transparent plate that has predetermined rigidity and optical transparency; a first lens sheet that has a rectangular sheet form, is a part of a cylindrical surface with an axis line that extends in a first direction parallel to the transparent plate, and is warped in a shape convex toward a side of the transparent plate; a second lens sheet that is located on an opposite side of the transparent plate from the first lens sheet, has a rectangular sheet form, is a part of a cylindrical surface with an axis line that extends in a direction parallel to the transparent plate and perpendicular to the first direction, is warped in a shape convex toward a side of the transparent plate, and sandwiches the transparent plate with the first lens sheet; and four rims being elongated and having U-shapes in cross section that respectively cover outer peripheries of four sides of a laminated body including the transparent plate, the first lens sheet, and the second lens sheet, wherein one of the rims parallel to the first direction has an inner side surface of a U-shape in cross section that loosely holds the outer periphery of the laminated body fitted therein with a clearance therebetween, and remaining three of the rims have elastic members each located between an inner side surface of a U-shape in cross section and a concave surface of the first lens sheet or the second lens sheet, and pinches the first lens sheet and the second lens sheet to be pressed against the transparent plate with biasing force of the elastic member to support the first lens sheet and the second lens sheet.

A projection display apparatus according to another aspect of the present invention includes a projection unit that emits image light; a reflection mirror that reflects the image light emitted by the projection unit; and a screen unit having a back surface on which the image light reflected by the reflection mirror is projected, wherein the screen unit is located on a front surface of the apparatus, the projection unit is located on a lower side of a rear portion of the apparatus, and the image light emitted upward from the projection unit is reflected downward by the reflection mirror located on an upper portion of the apparatus to cause the image light to enter the back surface of the screen unit at a sharp angle, wherein the screen unit includes: a thin sheet glass that has predetermined rigidity and optical transparency; a Fresnel lens sheet that has a rectangular sheet form, is a part of a cylindrical surface with an axis line that extends in a first direction parallel to the thin sheet glass, and is warped in a shape convex toward a side of the thin sheet glass; a lenticular lens sheet that is located on an opposite side of the thin sheet glass from the Fresnel lens sheet, has a rectangular sheet form, is a part of a cylindrical surface with an axis line that extends in a direction parallel to the thin sheet glass and perpendicular to the first direction, is warped in a shape convex toward a side of the thin sheet glass, and sandwiches the thin sheet glass with the Fresnel lens sheet; and four rims being elongated and having U-shapes in cross section that respectively cover outer peripheries of four sides of a laminated body including the thin sheet glass, the Fresnel lens sheet, and the lenticular lens sheet, wherein one of the rims parallel to the first direction has an inner side surface of a U-shape in cross section that loosely holds the outer periphery of the laminated body fitted therein with a clearance therebetween, and remaining three of the rims that have elastic members each located between an inner side surface of a U-shape in cross section and a concave surface of the Fresnel lens sheet or the lenticular lens sheet, and pinches the Fresnel lens sheet and the lenticular lens sheet to be pressed against the thin sheet glass with biasing force of the elastic member to support the Fresnel lens sheet and the lenticular lens sheet.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
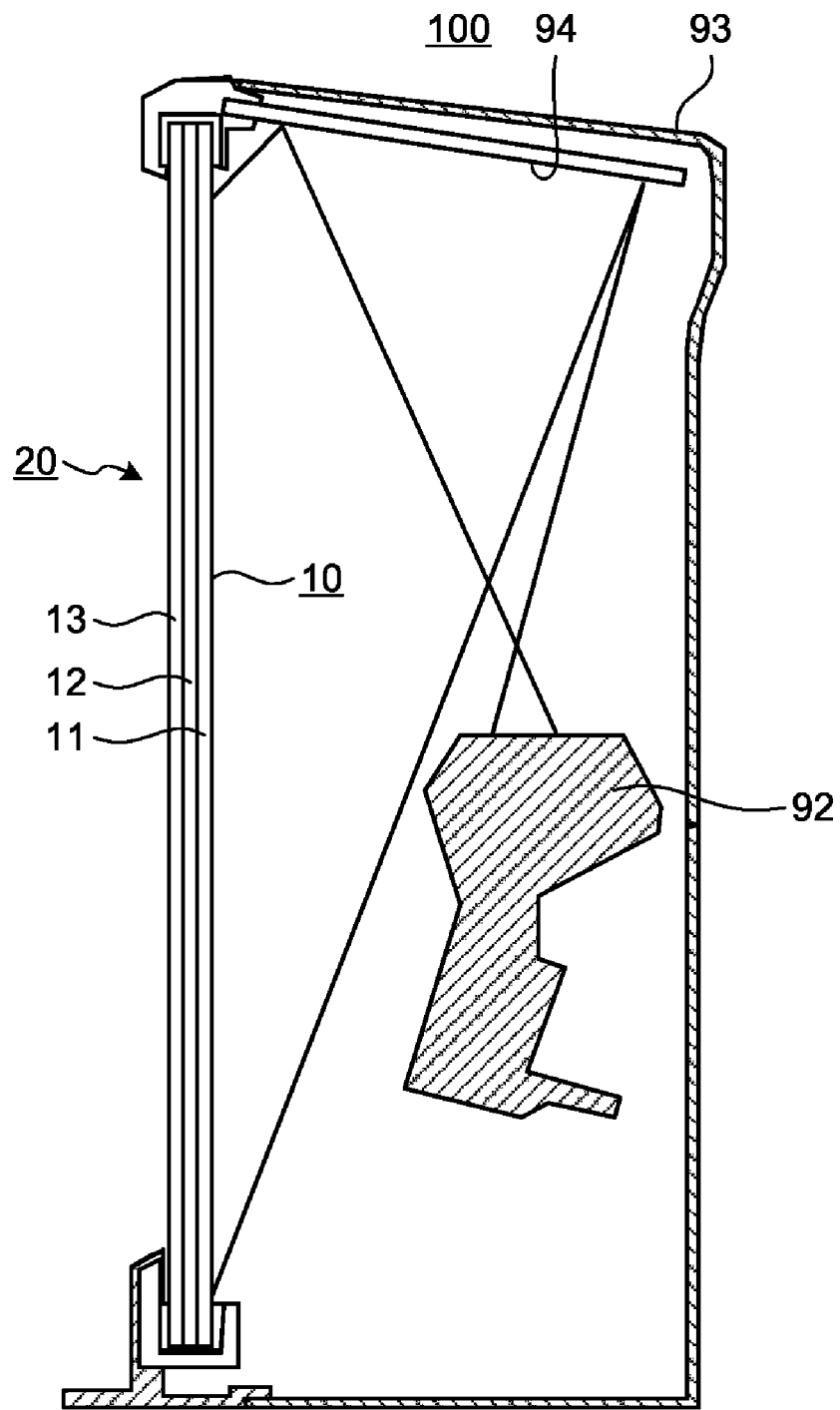
FIG. 1 is a vertical cross-sectional view of a projection display apparatus according to an embodiment of the present invention.
Figure 2:
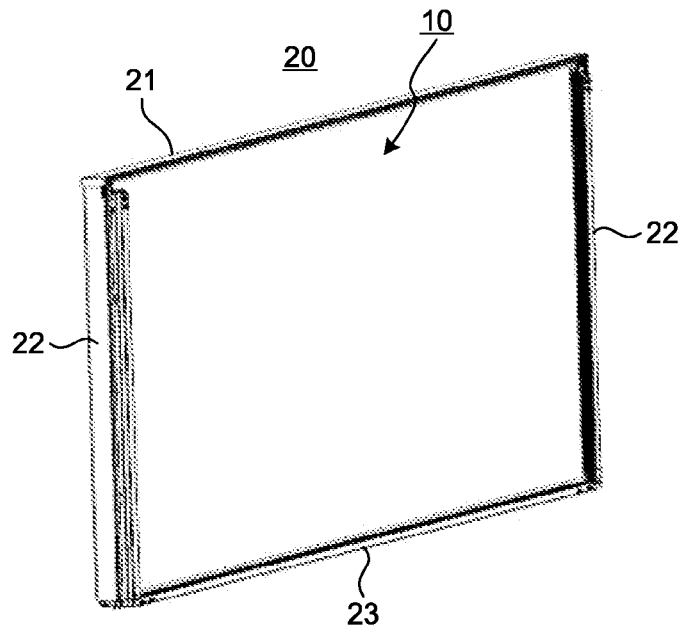
FIG. 2 is a perspective view of a screen unit shown in FIG. 1.
Figure 3:
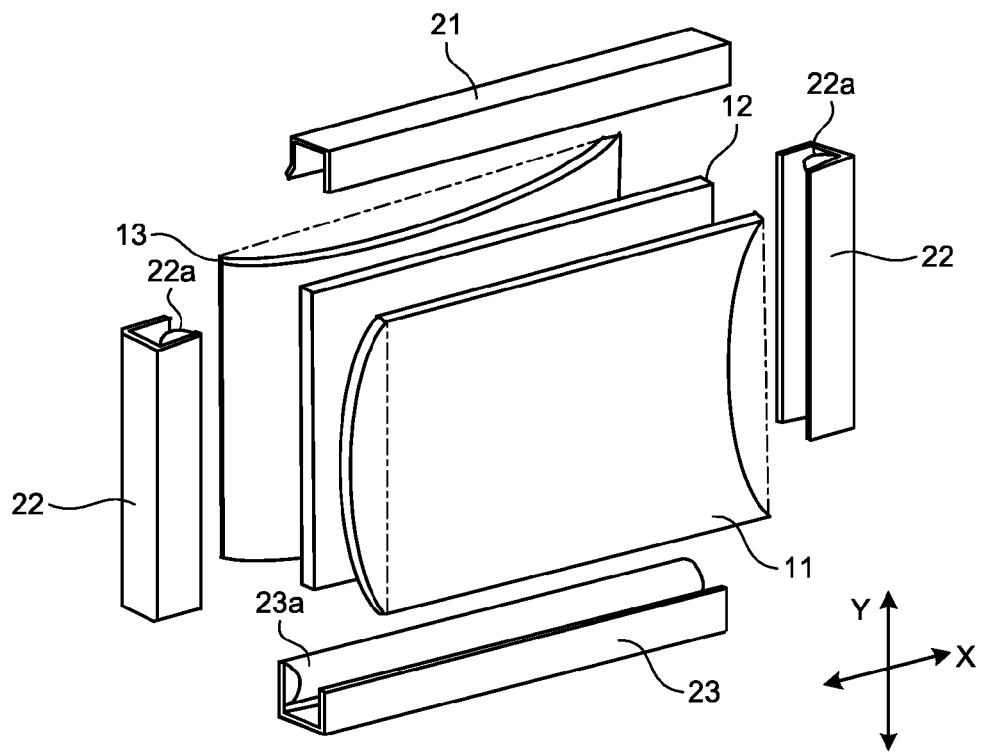
FIG. 3 is an exploded perspective view of the screen unit shown in FIG. 2.
Figure 4:
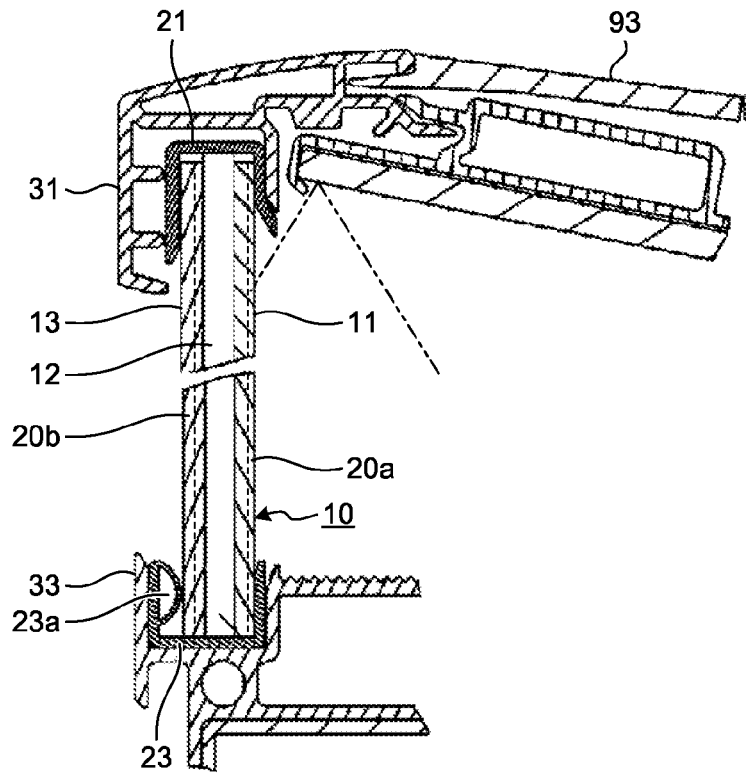
FIG. 4 is a vertical cross-sectional view of relevant parts, depicting details of screen holding units placed in a cabinet.
Figure 5:
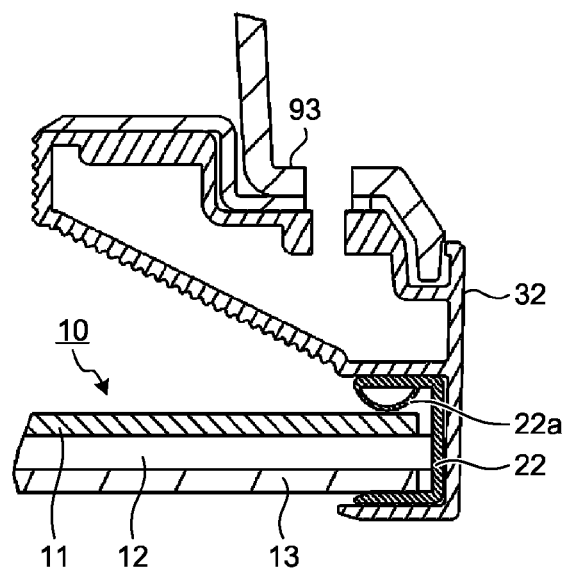
FIG. 5 is a horizontal cross-sectional view of relevant parts, depicting details of the screen holding unit placed in the cabinet.

Exemplary embodiments of the present invention will be explained below in detail with reference to the accompanying drawings. FIG. 1 is a vertical cross-sectional view of a projection display apparatus according to an embodiment of the present invention. FIG. 2 is a perspective view of a screen unit shown in FIG. 1. FIG. 3 is an exploded perspective view of the screen unit shown in FIG. 2. FIG. 4 is a vertical cross-sectional view of relevant parts, depicting details of screen holding units placed in a cabinet. FIG. 5 is a horizontal cross-sectional view of relevant parts, depicting details of the screen holding unit placed in the cabinet.

As shown in FIG. 1, a projection television 100 as an example of the projection display apparatus includes a cabinet 93 approximately in the shape of a box, which forms an outer envelope of the apparatus and has a front surface opened, a projection unit 92 that is placed on a lower side of a rear surface portion within the cabinet 93 and includes an optical engine having a semiconductor laser as a light source to emit image light from an emission port located on an upper surface thereof, a reflection mirror 94 that is placed in a top surface portion within the cabinet 93 and reflects the image light emitted by the projection unit 92, and a screen unit 20 that is placed to close the front surface opening of the cabinet 93 and has a back surface on which the image light reflected by the reflection mirror 94 is projected.

As mentioned above, the screen unit 20 is located on the front surface of the apparatus. Meanwhile, the projection unit 92 is placed on the lower side of the rear portion of the apparatus, and the image light generated by the optical engine is emitted upward from the projection unit 92. The image light emitted upward is reflected downward by the reflection mirror 94 placed on the upper side of the apparatus, and enters the back surface of the screen unit 20 at a sharp angle. According to the projection display apparatus 100 with this configuration, an incidence angle of the image light projected on the back surface of the screen unit 20 is made sharp, and a depth from the projection unit 92 to the screen unit 20 is set to be small.

As shown in FIGS. 2 and 3, the screen unit 20 includes a laminated body 10 that includes a thin sheet glass (transparent plate) 12, a Fresnel lens sheet (first lens sheet) 11 and a lenticular lens sheet (second lens sheet) 13 that are laminated to sandwich the thin sheet glass 12 therebetween, and rims (an upper horizontal rim 21, lateral vertical rims 22 and 22, and a lower horizontal rim 23) that surround all outer peripheries of the laminated body 10. The upper horizontal rim 21, the vertical rims 22 and 22 provided laterally, and the lower horizontal rim 23 are elongated and U-shaped in cross section, and extend along the entire length of four sides of the laminated body 10 to cover and protect the outer peripheries of the four sides of the laminated body 10 so that the outer peripheries are fitted therein.

The Fresnel lens sheet 11 has a rectangular sheet shape and is warped by heat treatment in a shape that forms a part of a cylindrical surface having an axis line extending in a first direction (in a X direction in FIG. 3, in a horizontal direction in the present embodiment) parallel to the thin sheet glass 12, and is convex toward the thin sheet glass 12. The lenticular lens sheet 13 also has a rectangular sheet shape, is placed on the opposite side of the thin sheet glass 12 from the Fresnel lens sheet 11, and is warped by heat treatment in a shape that forms a part of a cylindrical surface having an axis line extending in a second direction (in a Y direction in FIG. 3, in a vertical direction in the present embodiment) parallel to the thin sheet glass 12 and perpendicular to the first direction, and is convex toward the thin sheet glass 12.

While the Fresnel lens sheet 11 and the lenticular lens sheet 13 are laminated on the thin sheet glass 12 such that the curved shapes are pressed against the thin sheet glass 12 to be unbent along the thin sheet glass 12, they are not bonded with an adhesive agent or the like. A relation of curvature axes between the Fresnel lens sheet 11 and the lenticular lens sheet 13 can be changed in such a manner that the Fresnel lens sheet 11 has a vertical axis and the lenticular lens sheet 13 has a horizontal axis.

The upper horizontal rim 21 among the four rims is made of a hard resin that is hard and slippery on the surface, such as polyethylene. The upper horizontal rim 21 has an opening width slightly larger than the thickness of the laminated body 10, and is loosely fitted to an upper edge of the laminated body 10 leaving a small clearance in a thickness direction. As will be explained later, the upper horizontal rim 21 is loosely fitted to leave a small clearance also in a groove depth direction so that the laminated body 10 can move along the plane. An edge of the opening of the upper horizontal rim 21 is slightly bent in a direction to widen the opening so that the edge of the laminated body 10 can be easily fitted therein.

The vertical rims 22 and 22 provided laterally and the lower horizontal rim 23, which are the remaining three rims among the four rims, are made of a hard resin such as polyvinyl chloride. Each of the rims has an opening width that is a predetermined amount larger than the thickness of the laminated body 10. Hollow soft resin members (elastic members) 22a, 22a, and 23a are placed on inner side surfaces facing the concave surfaces of the Fresnel lens sheet 11 or the lenticular lens sheet 13.

Each of the hollow soft resin members 22a, 22a, and 23a is formed into a hollow tube by using a soft resin such as thermoplastic elastomer, has a hog-backed shape in cross section, and has high elasticity. Each of the hollow soft resin members 22a, 22a, and 23a has a flat surface fixed to one of inner side surfaces of a U-shape, and a curved convex surface facing toward inside of the U-shape. The lateral vertical rims 22 and 22 and the lower horizontal rim 23 pinch the edge of the laminated body 10 between the convex surfaces of the hollow soft resin members 22a, 22a, and 23a and the other inner side surface facing thereto to support the edge therebetween by pressing the edge with predetermined elastic force. The predetermined elastic force is one that enables to support the still laminated body 10 with frictional force so as not to move the laminated body 10, and allows a move of the laminated body 10 when force above a certain level is applied to slide the laminated body 10.

The convex surfaces of the hollow soft resin members 22a, 22a, and 23a are finished smoothly so that the edges of the laminated body 10 can be easily fitted therein. The lateral vertical rims 22 and 22 and the lower horizontal rim 23 support the laminated body 10 also leaving small clearances in groove depth directions so that the laminated body 10 can move along the plane, like in the upper horizontal rim 21.

As described above, the laminated body 10 is assembled by pressing the curbed shapes of the Fresnel lens sheet 11 and the lenticular lens sheet 13 against the thin sheet glass 12 to be unbent along the thin sheet glass 12 and laminate the sheets 11 and 13 on the thin sheet glass 12, and fitting the four side edges into the rims 21, 22, and 23 in that state. The fitted four side edges are not fixed with an adhesive agent or the like, and instead supported such that the edges positively move in the rims 21, 22, and 23 in the manner mentioned above.

As a base material of a transparent resin film forming the Fresnel lens sheet 11 used in the present embodiment, a transparent resin base material such as an acrylic resin, MS resin (a resin obtained by copolymerizing methyl methacrylate and styrene), or polycarbonate resin is used. As a base material of the lenticular lens sheet 13, polyester, polycarbonate, polyvinyl chloride or the like, which has similarly high transparency, is used. These materials greatly expand or contract according to environment changes in the temperature or humidity as compared to the thin sheet glass 12. These sheets are made to have smaller dimensions than the thin sheet glass 12 so as to accommodate an expansion or contraction difference.

Because the base materials of the Fresnel lens sheet 11 and the lenticular lens sheet 13 have almost the same temperature and humidity characteristics, manufacturing dimensions of these sheets are made the same. For example, when the entire length of the Fresnel lens sheet 11 and the lenticular lens sheet 13 is 1,000 millimeters (mm) assuming that a temperature change is 40 degrees and a coefficient E of thermal expansion of a typical base material is $E=5\times10^{-5}$, the sheets expand by 2.0 millimeters. Assuming that a coefficient R of water absorption for 24 hours is $R=9\times10^{-4}$, the sheets swell by about 0.1 millimeter when the entire length is 1,000 millimeters. Accordingly, by reducing the size of the Fresnel lens sheet 11 and the lenticular lens sheet 13 by 2.0+0.1=2.1 mm as compared to the thin sheet glass 12, the Fresnel lens sheet 11 and the lenticular lens sheet 13 can be kept in the same size as that of the thin sheet glass 12 even in a state where the temperature change is 40 degrees and the sheets absorb water in high-humidity environments.

The Fresnel lens sheet 11 is curbed by heat treatment to be convex toward the thin sheet glass 12, the curved surface of which corresponds to a cylindrical shape rotated around a horizontal axis. For example, when the lens sheet is for a model 75 and is 2.5 millimeters thick, it has a deformation amount of a convex of 20 to 50 millimeters in the center. Meanwhile, the lenticular lens sheet 13 is curved by heat treatment to be convex toward the thin sheet glass 12, the curved surface of which corresponds to a cylindrical shape rotated around a vertical axis. For example, when the lens sheet is for the model 75 and is 2.5 millimeters thick, it has a deformation amount of a convex of 100 to 200 millimeters in the center. An amount of warpage of the entire screen unit 20 can be made smaller than that in the conventional technique in which the Fresnel lens sheet 11 and the lenticular lens sheet 13 are curved in the same direction. Therefore, an operation to attach the upper horizontal rim 21, the lateral vertical rims 22, and the lower horizontal rim 23 to the four side edges of the screen unit 20 can be performed more easily.

The upper horizontal rim 21 that holds the upper side of the screen unit 20 is made of polyethylene or polyvinyl chloride, which is hard and has a high surface slip property, as a base material and is molded in a U-shape having a width slightly larger than the thickness of the laminated body 10, by 0.2 millimeter, for example. Therefore, it contributes to increase in flatness of the laminated body 10 and also improves insertability of the laminated body 10. The lateral vertical rim 22 that holds the lateral side of the screen unit 20 is integrally molded in a size smaller than the thickness of the laminated body 10 by using polyvinyl chloride as a base material and using the hollow soft resin member 22a, thermoplastic elastomer, for example, in a hollow shape at a contact portion with the laminated body 10. The lateral vertical rim 22 is molded in a width smaller than the thickness of the laminated body 10 by 0.5 millimeter, for example, and holds the Fresnel lens sheet 11 and the lenticular lens sheet 13 with the elastic force of the hollow soft resin member 22a to prevent the sheets 11 and 13 from moving away from the thin sheet glass 12. The hollow soft resin member 22a has a highly slippery surface and the laminated body 10 can easily move by slipping thereon. A coefficient of thermal expansion of the base material of the lateral vertical rim 22 is set to be the same as that of the Fresnel lens sheet 11 and the lenticular lens sheet 13. Accordingly, even when the temperature changes, the rim 22 expands or contracts by the same amount as that of the sheets 11 and 13 and is not deformed.

A support structure of the screen unit 20 is configured by laminating the Fresnel lens sheet 11, the thin sheet glass 12, and the lenticular lens sheet 13 to form the laminated body 10, attaching the upper horizontal rim 21, the lateral vertical rims 22, and the lower horizontal rim 23 to the four side edges of the laminated body 10 to integrally assemble the screen unit 20, fitting an upper portion of the screen unit 20 into an insertion groove of a screen support unit 31, fitting lateral portions into insertion grooves of screen support units 32 and 32, respectively, fitting a lower portion into an insertion groove of a screen support unit 33, and connecting the screen support units 31, 32, 32, and 33 surrounding the four sides to each other with a joint member, thereby forming a frame. The screen support units 31, 32, 32, and 33 are connected to an opened opening edge of the cabinet 93.

The screen unit 20 is inserted into a rim body formed by the screen support units 31, 32, 32, and 33 with the four side edges of the laminated body 10 pinched by the upper horizontal rim 21, the lateral vertical rims 22, and the lower horizontal rim 23, thereby easily achieving insertion of the screen unit 20 into the grooves of the rim body. The insertion grooves of the screen support units 31, 32, 32, and 33 are formed slightly larger than the widths of the upper horizontal rim 21, the lateral vertical rims 22, and the lower horizontal rim 23, respectively, so that the screen unit 20 can move in the planar direction. The screen support units 31, 32, 32, and 33 form the outer envelope of the projection television 100 together with the cabinet 93 and are made of an extrusion material of aluminum, for example, to keep the outer envelope strong. Assuming that a dimension of the lateral vertical rim 22 pinching the screen unit is "a" and a fitting dimension of the lateral screen support unit 32 and the lateral vertical rim 22 is "b", the screen unit 20 can be held in such a manner that b=a+1.75 mm is satisfied. Accordingly, it is possible to thin the frame while maintaining rigidity of the frame by using the extrusion material of aluminum as a material of the lateral screen support unit 32, thereby realizing a thin-rim design having a minimum c-dimension from a product outline to the screen opening. Here, "a" has a value that prevents the lenticular lens sheet 13 from slipping out of the lateral vertical rim 22 due to heat contraction or vibration during transportation. For example, in the case of a screen size of the model 75, when "a" is 8 millimeters, b=a+1.75 mm=9.75 mm, and accordingly the c-dimension can be set to 13 millimeters by setting the thickness of the aluminum material of the screen support unit 32 to 1.5 millimeters. A coefficient of thermal expansion of aluminum, which is the material of the screen support units 31, 32, and 33, is greatly smaller than the coefficients of thermal expansion of the Fresnel lens sheet 11, the lenticular lens sheet 13, the upper horizontal rim 21, the lateral vertical rims 22, and the lower horizontal rim 23. While amounts of expansion or contraction due to the temperature changes are different, no deformation is produced because the upper horizontal rim 21, the lateral vertical rims 22, and the lower horizontal rim 23 have the structures that enable to move within the insertion grooves. In this way, while the Fresnel lens sheet 11, the lenticular lens sheet 13, the upper horizontal rim 21, the lateral vertical rims 22, and the lower horizontal rim 23 expand or contract due to environment changes in the temperature or humidity around the projection television 100, the Fresnel lens sheet 11 and the lenticular lens sheet 13 slip on the surfaces of the hollow soft resin members 22a and 23a of the lateral vertical rims 22 and the lower horizontal rim 23, and no deformation is produced in the laminated body 10.

A diffusion material is integrally molded on the Fresnel lens sheet 11 and the lenticular lens sheet 13, respectively. A first imaging surface 20a is formed on the lens surface side of the Fresnel lens sheet 11, and a second imaging surface 20b is formed on a surface of the lenticular lens sheet 13 contacting the thin sheet glass 12. By holding the screen unit 20 with the upper horizontal rim 21, the lateral vertical rims 22, and the lower horizontal rim 23, the first imaging surface 20a and the second imaging surface 20b can be placed in parallel to each other leaving a predetermined interval therebetween. Therefore, scintillation can be reduced.

According to the projection television 100 of the present embodiment, the lateral vertical rims 22 and the lower horizontal rim 23 support the laminated body 10 with the hollow soft resin members 22a and 23a having high slip properties and high flexibilities, and therefore the hollow soft resin members 22a and 23a also produce effects of cushioning materials. Accordingly, occurrence of blooming on the Fresnel lens sheet 11 or the lenticular lens sheet 13 due to vibration of the projection television 100 during transport can be prevented, or damage of the screen unit 20 due to dropping-out can be prevented.

According to the present invention, axes of curbed surfaces of the Fresnel lens sheet (first lens sheet) and the lenticular lens sheet (second lens sheet) are oriented in different directions, which prevents positions of large warpage in the both sheets from being superimposed and concentrated in a thickness direction of the laminated body. Accordingly, an amount of warpage in the thickness direction can be dispersed to reduce a total amount of warpage at the maximum position as compared to the conventional case where the axes of the curbed surfaces are oriented in the same direction, which causes reaction force produced by the warpage to be dispersed and prevents the reaction force from becoming locally large. Therefore, manufacturing effects such as easy attachment of rims and easy assembly of rims to the screen holding units can be obtained. Because the lens sheets are pressed against the thin sheet glass (transparent plate) with predetermined biasing force by providing the elastic members between the U-shaped rims and the lens sheets, the lens sheets are flattened. By using the thin sheet glass as the transparent plate, the screen unit can be provided at lower costs than those in the conventional method in which the Fresnel lens sheet and the lenticular lens sheet are bonded to the glass.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A screen unit comprising:

a transparent plate that has predetermined rigidity and optical transparency;

a first lens sheet that has a rectangular sheet form, is a part of a cylindrical surface with an axis line that extends in a first direction parallel to the transparent plate, and is warped in a shape convex toward a side of the transparent plate;

a second lens sheet that is located on an opposite side of the transparent plate from the first lens sheet, has a rectangular sheet form, is a part of a cylindrical surface with an axis line that extends in a direction parallel to the transparent plate and perpendicular to the first direction, is warped in a shape convex toward a side of the transparent plate, and sandwiches the transparent plate with the first lens sheet; and four rims being elongated and having U-shapes in cross section that respectively cover outer peripheries of four sides of a laminated body including the transparent plate, the first lens sheet, and the second lens sheet, wherein one of the rims parallel to the first direction has an inner side surface of a U-shape in cross section that loosely holds the outer periphery of the laminated body fitted therein with a clearance therebetween, and remaining three of the rims have elastic members each located between an inner side surface of a U-shape in cross section and a concave surface of the first lens sheet or the second lens sheet, and pinches the first lens sheet and the second lens sheet to be pressed against the transparent plate with biasing force of the elastic member to support the first lens sheet and the second lens sheet.

2. The screen unit according to claim 1, wherein the transparent plate is a thin sheet glass.

3. The screen unit according to claim 2, wherein
the first lens sheet is a Fresnel lens sheet, and
the second lens sheet is a lenticular lens sheet.

4. The screen unit according to claim 3, wherein a first imaging surface is formed on an incidence plane side of the Fresnel lens, a second imaging surface is formed on a thin sheet glass side of the lenticular lens sheet, and the first imaging surface and the second imaging surface are held in parallel to each other with the thin sheet glass located therebetween.

5. The screen unit according to claim 1, wherein the rims support the laminated body to enable the laminated body to move in a planar direction when force equal to or larger than a certain level is applied.

6. The screen unit according to claim 1, wherein each of the elastic members has a hollow tubular shape with high flexibility, and has a convex surface being finished to have a high slip property and in contact with the first lens sheet or the second lens sheet.

7. A projection display apparatus comprising:
a projection unit that emits image light;
a reflection mirror that reflects the image light emitted by the projection unit; and
a screen unit having a back surface on which the image light reflected by the reflection mirror is projected, wherein the screen unit is located on a front surface of the apparatus, the projection unit is located on a lower side of a rear portion of the apparatus, and the image light emitted upward from the projection unit is reflected downward by the reflection mirror located on an upper portion of the apparatus to cause the image light to enter the back surface of the screen unit at a sharp angle, wherein the screen unit includes:
a thin sheet glass that has predetermined rigidity and optical transparency;
a Fresnel lens sheet that has a rectangular sheet form, is a part of a cylindrical surface with an axis line that extends in a first direction parallel to the thin sheet glass, and is warped in a shape convex toward a side of the thin sheet glass;
a lenticular lens sheet that is located on an opposite side of the thin sheet glass from the Fresnel lens sheet, has a rectangular sheet form, is a part of a cylindrical surface with an axis line that extends in a direction parallel to the thin sheet glass and perpendicular to the first direction, is warped in a shape convex toward a side of the thin sheet glass, and sandwiches the thin sheet glass with the Fresnel lens sheet; and
four rims being elongated and having U-shapes in cross section that respectively cover outer peripheries of four sides of a laminated body including the thin sheet glass, the Fresnel lens sheet, and the lenticular lens sheet, wherein
one of the rims parallel to the first direction has an inner side surface of a U-shape in cross section that loosely holds the outer periphery of the laminated body fitted therein with a clearance therebetween, and
remaining three of the rims that have elastic members each located between an inner side surface of a U-shape in cross section and a concave surface of the Fresnel lens sheet or the lenticular lens sheet, and pinches the Fresnel lens sheet and the lenticular lens sheet to be pressed against the thin sheet glass with biasing force of the elastic member to support the Fresnel lens sheet and the lenticular lens sheet.

* * * * *

UNITED STATES PATENT AND TRADEMARK OFFICE
CERTIFICATE OF CORRECTION

PATENT NO. : 8,356,906 B2
APPLICATION NO. : 13/017257
DATED : January 22, 2013
INVENTOR(S) : Tomomi Matsui It is certified that error appears in the above-identified patent and that said Letters Patent is hereby corrected as shown below:

ON THE TITLE PAGE:

At item (73), Assignee, change:

"(73) Assignee:    Mitsubishi Electric Corp., Tokyo (JP)"

to

--(73) Assignee:    Mitsubishi Electric Corporation, Tokyo (JP)--.

Signed and Sealed this
Eleventh Day of June, 2013

Teresa Stanek Rea
*Acting Director of the United States Patent and Trademark Office*